US011718771B2

(12) United States Patent
Shiu et al.

(10) Patent No.: US 11,718,771 B2
(45) Date of Patent: Aug. 8, 2023

(54) POLYMER COMPOSITION AND FIBER OR NON-WOVEN FABRIC MADE THEREFROM

(71) Applicant: TSRC Corporation, Kaohsiung (TW)

(72) Inventors: Tai-Yi Shiu, Kaohsiung (TW); Feng-Yu Yang, Kaohsiung (TW); Yu-Chuan Tsai, Kaohsiung (TW); Der-Kai Sun, Kaohsiung (TW); Ching Ting, Kaohsiung (TW)

(73) Assignee: TSRC Corporation, Kaohsiung (TW)

( * ) Notice: Subject to any disclaimer, the term of this patent is extended or adjusted under 35 U.S.C. 154(b) by 176 days.

(21) Appl. No.: 17/091,893

(22) Filed: Nov. 6, 2020

(65) Prior Publication Data

US 2021/0139692 A1 May 13, 2021

Related U.S. Application Data

(60) Provisional application No. 62/932,731, filed on Nov. 8, 2019.

(51) Int. Cl.
| | | |
|---|---|---|
| *C09J 7/38* | (2018.01) | |
| *C09J 7/24* | (2018.01) | |
| *C09J 109/06* | (2006.01) | |
| *C08L 23/12* | (2006.01) | |
| *C08L 53/02* | (2006.01) | |
| *C09J 153/02* | (2006.01) | |
| *C09J 7/20* | (2018.01) | |
| *C09J 125/10* | (2006.01) | |

(52) U.S. Cl.
CPC ............ *C09J 7/387* (2018.01); *C08L 23/12* (2013.01); *C08L 53/02* (2013.01); *C09J 7/20* (2018.01); *C09J 7/243* (2018.01); *C09J 109/06* (2013.01); *C09J 125/10* (2013.01); *C09J 153/025* (2013.01); *C08K 2201/019* (2013.01); *C09J 2301/302* (2020.08); *C09J 2301/312* (2020.08); *C09J 2301/408* (2020.08); *C09J 2409/00* (2013.01); *C09J 2423/00* (2013.01); *C09J 2425/00* (2013.01); *C09J 2453/00* (2013.01)

(58) Field of Classification Search
CPC .......... C09J 7/387; C09J 7/243; C09J 109/06; C08L 23/12; C08L 53/02
See application file for complete search history.

(56) References Cited

U.S. PATENT DOCUMENTS

| | | | |
|---|---|---|---|
| 5,260,126 A | * | 11/1993 | Collier, IV ............ C08L 53/025 524/505 |
| 2006/0030665 A1 | | 2/2006 | Joly et al. |
| 2007/0055015 A1 | | 3/2007 | Flood et al. |
| 2017/0275392 A1 | | 9/2017 | Flood et al. |

FOREIGN PATENT DOCUMENTS

| | | |
|---|---|---|
| CN | 101213253 A | 7/2008 |
| JP | 2006152525 A | 6/2006 |
| TW | 200722476 | 6/2007 |
| WO | 2007027990 A2 | 3/2007 |

OTHER PUBLICATIONS

Taiwanese Search Report dated May 24, 2021 in corresponding Taiwanese Application No. 109138977.
European Search Report dated Feb. 27, 2021 in corresponding European Publication No. 3819339.
Japanese Notice of Reasons for Refusal dated Nov. 30, 2021 in corresponding Japanese Publication No. 2020186057.
Taiwanese Examination Report dated Dec. 14, 2021 in corresponding Taiwanese Application No. 109138977.
Chinese Examination Report dated Dec. 28, 2022 in corresponding Chinese Application No. 202011231165.1.

* cited by examiner

*Primary Examiner* — Cephia D Toomer
(74) *Attorney, Agent, or Firm* — Snell & Wilmer L.L.P.

(57) ABSTRACT

The present invention provides a polymer composition for fibers or non-woven fabrics, comprising a vinyl aromatic based copolymer and 0 to 30 wt % of an olefin based polymer based on the total weight of the polymer composition. The vinyl aromatic copolymer is represented by a formula A1-B-A2, wherein block A1 and block A2 are the same or different vinyl aromatic blocks, block A1 or block A2 having 3,800 to 4,800 of a peak molecular weight, and block B is a hydrogenated conjugated diene block. A vinyl structure content of a conjugated diene monomer in the vinyl aromatic based copolymer is from 32 wt % to 50 wt %; and a melt flow index (MFI) of the vinyl aromatic based copolymer is 20 g/10 min~60 g/10 min (230° C., 2.16 kg). The present invention also provides the fibers or the non-woven fabrics made from the polymer composition.

20 Claims, No Drawings

POLYMER COMPOSITION AND FIBER OR NON-WOVEN FABRIC MADE THEREFROM

CROSS REFERENCE TO RELATED APPLICATION

This application claims the benefit of priority of U.S. Provisional Application No. 62/932,731 filed on Nov. 8, 2019 and entitled "Polymer compositions and pressure sensitive adhesives, films, fibers or nonwoven fabrics thereof", which is incorporated herein by reference and assigned to the assignee herewith.

BACKGROUND OF THE INVENTION

Field of the Invention

The present invention relates to a polymer composition, in particular to a polymer composition comprising a vinyl aromatic based copolymer and the application to fibers or non-woven fabrics thereof.

Description of the Prior Art

The non-woven fabric is a viable application of the vinyl aromatic based copolymers. Generally, non-woven fabrics are made from polypropylene using spun bonding and melt blowing equipment, but such non-woven fabrics have no elasticity or stretch ability. In recent years, due to the growing demand for high air permeability and elastic properties of hygiene products, the development of elastic non-woven fabrics can meet such application demand. U.S. Pat. No. 9,963,585 discloses a thermoplastic styrene elastomer used for fiber extrusion, which has excellent elastic properties. During the processing of this elastomer, it is difficult to process and mold due to the poor flow properties of the elastomer. Therefore, it is necessary to add high-flowability polyolefin polymers or increase the processing temperature for successful processing and molding. However, the addition of high-flowability polyolefin polymers will lose the superior elastic properties of the non-woven fabric/fiber. Further, at elevated processing temperatures, the extruded fibers will easily adhere to each other, resulting in poor quality of the non-woven fabric and difficulties in successful processing.

U.S. Pat. Nos. 7,910,208 and 8,003,209 propose the use of high-flowability styrene copolymers and their formulations, in which the materials need to be processed in the two-component spun bonding equipment for producing elastic non-woven fabrics at high speed. However, the two-component spun bonding equipment is scarce and not widely used in general manufacturing of non-woven fabrics. On the other hand, these patents mention that the elastomer has a high vinyl structure of 70~85 wt %, which will sacrifice the performance of elastic recovery force (unload stress), resulting in poor elastic properties. In addition, the patent No. TWI641636 also discloses a vinyl aromatic based copolymer-containing polymer composition that can be applied to fibers, but it still has the disadvantage of insufficient flowability.

SUMMARY OF THE INVENTION

In one aspect, the present invention provides a polymer composition for fibers and non-woven fabrics, comprising a vinyl aromatic based copolymer and an olefin based polymer of 0 to 30 wt % based on a total weight of the polymer composition. The vinyl aromatic based copolymer is the vinyl aromatic based copolymer with good flow properties.

In another aspect, the present invention provides the polymer composition for fibers and non-woven fabrics as described above, wherein the vinyl aromatic based copolymer is represented by a formula of A1-B-A2, block A1 and block A2 represent identical or different vinyl aromatic blocks, block A1 or block A2 has a peak molecular weight of 3,800~4,800, and block B represents a hydrogenated conjugated diene block. A vinyl structure content of a conjugated diene monomer content in the vinyl aromatic based copolymer is 32 wt %~50 wt %, and a melt flow index (MFI) of the vinyl aromatic based copolymer is 20 g/10 min~60 g/10 min (230° C., 2.16 kg).

In another aspect, the present invention provides a fiber and a non-woven fabric made from the polymer composition, in particular a fiber and a non-woven fabric with elasticity for applications to hygiene materials and fabrics.

The present invention also includes other aspects for solving other problems, which will be combined with the above aspects and disclosed in detail in the following embodiments.

DETAILED DESCRIPTION OF THE EMBODIMENTS

The preferred embodiments of the present invention will be demonstrated below to further illustrate the methods, features and advantages of the present invention, but is not used to limit the scope of the present invention. The scope of the present invention should be subject to the appended claims. In order to avoid obscuring the content of the present invention, the following description also omits conventional components, related materials, and related processing techniques.

Measurement Methods of Various Properties in the Present Invention

The vinyl aromatic monomer content of the vinyl aromatic based copolymer: measured with a nuclear magnetic resonance analyzer, which is a measurement method well known to those skilled in the art.

The vinyl structure content of the conjugated diene monomer content in the vinyl aromatic based copolymer: measured with a nuclear magnetic resonance analyzer, which is a measurement method well known to those skilled in the art.

Peak molecular weight/weight average molecular weight of the vinyl aromatic block of the vinyl aromatic based copolymers and peak molecular weight/weight average molecular weight of the vinyl aromatic based copolymers: measured by gel permeation chromatography, which is a measurement method well known to those skilled in the art.

True molecular weight of the vinyl aromatic block of the vinyl aromatic based copolymer and true molecular weight of the vinyl aromatic based copolymer: measured by a gel permeation chromatography-light scattering instrument, which is a measurement method well known to those skilled in the art.

Hydrogenation rate of the conjugated diene block of the vinyl aromatic based copolymer: measured with a nuclear magnetic resonance analyzer, which is a measurement method well known to those skilled in the art.

Diblock content of the vinyl aromatic based copolymer: measured with a nuclear magnetic resonance analyzer, which is a measurement method well known to those skilled in the art.

Order-disorder transition temperature (ODT): measured with dynamic mechanical analysis (DMA) using TA Instruments ARES-II, which is a measurement method well known to those skilled in the art.

Melt Flow Index (MFI): measured according to ASTM D1238 standard.

200% peak stress: measured according to ASTM D882 standard.

50% elastic recovery force or referred to 50% unload stress (MPa): measured according to ASTM D882 standard. The elastic recovery force represents the strength value maintained by the sample during the recovery process, so the higher the value of the elastic recovery force, the better the elasticity.

Permanent set: measured according to ASTM D882 standard. The lower the permanent set, the better the elasticity.

Vinyl Aromatic Based Copolymer

The present invention provides the vinyl aromatic based copolymer with good flow properties. The vinyl aromatic based copolymer is represented by a formula of A1-B-A2, wherein block A1 and block A2 represent identical or different vinyl aromatic blocks, block A1 or block A2 has a peak molecular weight of 3,800~4,800, and block B represents a hydrogenated conjugated diene block. A vinyl structure content of a conjugated diene monomer content in the vinyl aromatic based copolymer is 32 wt %~50 wt %, preferably less than or equal to 45 wt %, for example, 32 wt %~45 wt %, more preferably 32 wt %~42 wt %, and particularly preferably 36 wt %~40 wt %. A melt flow index (MFI) of the vinyl aromatic based copolymer is 20 g/10 min~60 g/10 min (230° C., 2.16 kg), preferably 30 g/10 min~50 g/10 min (230° C., 2.16 kg), particularly preferably 35 g/10 min~45 g/10 min (230° C., 2.16 kg). A 50% unload stress of the vinyl aromatic based copolymer is more than or equal to 0.49 MPa. A permanent set of the vinyl aromatic based copolymer is less than or equal to 25%. In a preferred embodiment, a vinyl aromatic monomer content of the vinyl aromatic based copolymer is 16 wt %~28 wt %, preferably 18 wt %~26 wt %, or more preferably 20 wt %~24 wt %. In a preferred embodiment, block B represents a hydrogenated conjugated diene block with a hydrogenation rate of at least 90%, more preferably a hydrogenated conjugated diene block with a hydrogenation rate of more than 95%. According to a preferred embodiment, an order-disorder transition temperature (ODT) of the vinyl aromatic based copolymer is 200° C.~220° C. In a preferred embodiment, a peak molecular weight of the vinyl aromatic based copolymer is 62,000~74,000, more preferably 64,000~72,000; and a true molecular weight corresponding to the peak molecular weight described above is preferably 38,000~46,000, more preferably 40,000~44,000; in which the peak molecular weight and the weight average molecular weight of the vinyl aromatic based copolymer have the same preferable and more preferable range. According to a preferred embodiment, the peak molecular weight of block A1 or block A2 has a preferable range of 3,800~4,800 and a more preferable range of 4,400~4,700, in which the peak molecular weight, true molecular weight and weight average molecular weight of block A1 or block A2 have the same range.

Block A1 or block A2 is a vinyl aromatic block, which can be derived from a vinyl aromatic monomer. For example, the vinyl aromatic monomer can be selected from the following: styrene, methyl styrene, ethyl styrene, tert-butyl styrene, dimethyl styrene, methoxystyrene, cyclohexyl styrene, vinyl biphenyl, 1-vinyl-5-hexylnaphthalene, vinyl naphthalene, vinyl anthracene, 2,4-diisopropylstyrene, 5-tert-butyl-2-methylstyrene, divinylbenzene, trivinylbenzene, divinylnaphthalene, tert-butoxystyrene, 4-propylstyrene, 4-dodecyl styrene, 2-ethyl-4-benzylstyrene, 4-(phenylbutyl) styrene, N-4-vinylphenyl-N,N-dimethylamine, (4-vinyl phenyl) dimethylaminoethyl ether, N,N-dimethylaminomethylstyrene, N,N-dimethylaminoethylstyrene, N,N-diethylaminomethylstyrene, N,N-di ethylaminoethylstyrene, vinyl xylene, vinyl pyridine, diphenyl ethylene, 2,4,6-trimethylstyrene, α-methyl-2,6-dimethylstyrene, α-methyl-2,4-dimethylstyrene, β-methyl-2,6-dimethylstyrene, β-methyl-2,4-dimethyl styrene, indene, diphenylethylene containing a tertiary amino group and any combinations thereof. Block A1 and block A2 are identical or different vinyl aromatic blocks. Block B is preferably a hydrogenated conjugated diene block with a hydrogenation rate of at least 90%, and the monomers can be derived, for example, from the following: 1,3-butadiene, 1,3-pentadiene, 1,3-hexadiene, 1,3-heptadiene, 2-methyl-1,3-butadiene (isoprene), 2-methyl-1,3-pentadiene, 2-hexyl-1,3-butadiene, 2-phenyl-1,3-butadiene, 2-phenyl-1,3-pentadiene, 2-p-tolyl-1,3-butadiene, 2-benzyl-1,3-butadiene, 3-methyl-1,3-pentadiene, 3-methyl-1,3-hexadiene, 3-butyl-1,3-octadiene, 3-phenyl-1,3-pentadiene, 4-methyl-1,3-pentadiene, 1,4-diphenyl-1,3-butadiene, 2,3-dimethyl-1,3-butadiene, 2,3-dimethyl-1,3-pentadiene, 2,3-dibenzyl-1,3-butadiene, 4,5-diethyl-1,3-octadiene, myrcene and any combinations thereof.

From the above, it can be seen that the vinyl aromatic based copolymer is a linear block copolymer, and the structure does not contain a residue of a coupling agent. In a preferred embodiment, the diblock content of the vinyl aromatic based copolymer is less than 3 wt %, more preferably less than 1 wt %, based on the total weight of the vinyl aromatic based copolymer.

The method for producing the aforementioned vinyl aromatic based copolymer includes anionic polymerization and hydrogenation. Regarding the anionic polymerization process, the preferred option is to use the organic alkali metal compound containing organolithium as the catalyst initiator, so that the selected monomer can be added in a suitable solvent at a temperature of 0° C. to 100° C. to obtain an active polymer. Since the end of the molecular chain contains a carbon-lithium ion, when the monomer is added, the molecular chain will grow and the polymerization will continue. Specific examples of organolithium initiators include n-propyl lithium, isopropyl lithium, n-butyl lithium, sec-butyl lithium, tert-butyl lithium, n-pentyl lithium, phenyl lithium, tolyl lithium, etc., preferably n-butyl lithium or sec-butyl lithium. The amount of organolithium initiator used in the polymerization depends on the molecular weight of the polymer to be obtained, which usually depends on the actual consumption of the overall monomers. For the method of anionic polymerization, reference may be made to similar documents such as U.S. Pat. No. 4,039,593. Suitable solvents for the polymerization reaction include a passive organic solvent, which means a solvent that does not participate in the reaction during the polymerization reaction. Examples of such solvents include aliphatic hydrocarbons such as butane, isobutane, pentane, n-pentane, isopentane, 2,2,4-trimethylpentane, isohexane, n-hexane, isoheptane, n-heptane, isooctane and n-octane; cycloalkanes such as cyclohexane, methylcyclohexane, ethylcyclohexane, cyclopentane, cycloheptane, and methylcyclopentane; and aromatic hydrocarbon compounds such as benzene, toluene, xylene, ethylbenzene, diethylbenzene and propylbenzene, in which the preferred solvent suitable for the present invention is cyclohexane.

The hydrogenation is carried out after the polymerization reaction. The conventional method used to prepare the hydrogenated block copolymer of the present invention involves a suitable catalyst or catalytic precursor which comprises a titanium-based catalytic system, a suitable reducing agent such as aluminum alkyls, and a suitable catalyst stabilizer such as the phosphate groups etc. Hydrogenation is usually carried out at a temperature range of 0° C.~200° C. and a hydrogen pressure range of 1~90 kg/cm². The catalyst concentration usually ranges from about 10 ppm to about 200 ppm of the titanium-based catalyst, based on the weight of the total solid content of the polymer. For the method of preparing hydrogenated block copolymers, reference may be made to similar documents such as U.S. Pat. No. 7,612,148.

Example of Vinyl Aromatic Based Copolymer-Polymer A

Polymer A is an exemplary example of the aforementioned vinyl aromatic based copolymer, which is prepared by the following method. A 100-liter reactor was charged with 48 kg of cyclohexane and 120 g of THF (tetrahydrofuran). 9.50 g of NBL (n-butyl lithium) and then 690 g of styrene monomer were added to initiate the reaction. After the polymerization of styrene was completed, 4.89 kg of butadiene was added. After the polymerization of butadiene was completed, 690 g of styrene was added. After the polymerization of styrene was completed, the SBS triblock copolymer was formed, and the polymerization of this polymer was stopped with methanol. 1000 g of the polymer solution of the SBS triblock copolymer prepared above was taken, placed in a pressure-resistant hydrogenation reactor and maintained in nitrogen atmosphere. 0.11 mmole of the stabilizer was dissolved into 10 ml of cyclohexane at room temperature; 0.055 mmole of bis(cyclopentadienyl)titanium dichloride was dispersed in 10 ml of cyclohexane; and 0.33 mmole of triisobutyl aluminum was dissolved in 10 ml of cyclohexane. The above solution was added to the SBS triblock copolymer. Hydrogen was injected at a pressure of 25 kg/cm' at 80° C. for hydrogenation. The SBS triblock copolymer was then hydrogenated until more than 95% of the butadiene double bonds were saturated. The produced polymer was deposited in water to form colloidal particles and then dried.

Examples of Vinyl Aromatic Based Copolymers-Polymer B and Polymer C

The preparation method of polymer B and polymer C is similar to that of polymer A, except that the preparation method of polymer B and polymer C adjusted the amount of NBL (n-butyllithium), which in turn changes the peak molecular weight of the styrene blocks of polymer B and polymer C (the peak molecular weight of block A1 or block A2 of the formula A1-B-A2). The rest of the preparation process is quite similar and will not be repeated redundantly.

The vinyl aromatic based copolymers T-6014, polymer D, polymer E and polymer F which are not included in the present invention.

The preparation method of T-6014, polymer D, polymer E, and polymer F is similar to that of polymer A, except that the preparation method of the above polymers adjusted the amount of NBL (n-butyllithium) and the use ratio of styrene to butadiene, which in turn changes the peak molecular weight, the styrene content and the peak molecular weight of the styrene block of the above polymers. The rest of the preparation process is quite similar and will not be repeated redundantly.

Regarding polymer A, polymer B and polymer C, as well as other vinyl aromatic based polymers that are used in the comparative examples and do not included in the present invention (T-6014, polymer D, polymer E, polymer F, MD-1648 (Kraton company product)), their properties are shown in Table 1. Compared with T-6014, polymer D, polymer E and polymer F (the peak molecular weight of the styrene block is above 5000), polymer A, polymer B and polymer C have obviously better melt flow indexes (MFI). Although MD-1648 has a higher melt flow index, it has insufficient elastic performance due to the high amount of vinyl structure.

TABLE 1

| Vinyl aromatic based copolymer | T-6014 | Polymer A | Polymer B | Polymer C | Polymer D | Polymer E | Polymer F | MD-1648 Kraton |
|---|---|---|---|---|---|---|---|---|
| MFI (230° C., 2.16 kg) (g/10 min) | 7.2 | 44.4 | 50.4 | 40.4 | 10.7 | 12.5 | 6.4 | 191 |
| Peak molecular weight (Mp, K) | 87 | 68 | 67 | 66 | 73 | 65 | 87 | 70 |
| Styrene content (wt %) | 18.5 | 23.6 | 23.5 | 23.7 | 27.9 | 31.8 | 23.6 | 19.5 |
| SM1(Mp) | 5230 | 4671 | 4493 | 3806 | 5503 | 5993 | 5430 | — |
| Vinyl content (wt %) | 37.8 | 40.4 | 40 | 37.1 | 39.8 | 36.3 | 39.7 | 76 |
| Hydrogenation rate of conjugated diene block (%) | >95 | >95 | >95 | >95 | >95 | >95 | >95 | >95 |

SM1: Representing the peak molecular weight of the styrene block (the peak molecular weight of the block A1 of formula A1-B-A2)

Polymer Composition

The present invention provides a polymer composition, which can be used to produce fiber/elastic non-woven fabric with superior elasticity/working flowability. According to one embodiment, the polymer composition of the present invention includes at least one vinyl aromatic based copolymer and 0 to 30 wt % (not greater than 30 wt %) olefin based polymer based on the total weight of the polymer composition.

The vinyl aromatic based copolymer may be the aforementioned vinyl aromatic based copolymer exemplified by polymer A, polymer B or polymer C. In other embodiments, for example, the vinyl aromatic based copolymer may be Styrene-Ethylene-Butylene-Styrene block copolymer (SEBS), Styrene-Ethylene-Propylene-Styrene block copolymer (SEPS), Styrene-Ethylene-(Ethylene-Propylene)-Styrene block copolymer (SEEPS), or a combination thereof, in which SEBS is the preferred example.

An olefin based polymer is an olefin based homopolymer, an olefin based copolymer, or a combination thereof. For example, the monomer of the olefin based polymer is preferably an olefin having 2~10 carbon atoms, more preferably an olefin having 2~8 carbon atoms, still more preferably an olefin having 2~5 carbon atoms, and particularly preferably an olefin having 2~4 carbon atoms. For example, the monomer of the olefin based polymer may be exemplified by ethylene, propylene, 1-butene, 1-pentene, 1-hexene, 1-heptene, 1-octene, 1-nonene, 1-decene, isobutylene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, isoprene, tetrafluoroethylene, 1-dodecene, 1-tetradecene, 1-hexadecene, 1-octadecene, 1-eicosene, cyclobutene, cyclopentene, cyclohexene, cyclooctene, 1,3-butadiene, 1,3-pentadiene, 3,4-dimethylcyclopentene, 3-methylcyclohexene, 2-(2-methylbutyl)-1-cyclohexene, 1,4-hexadiene, 4-methyl-1,4-hexadiene, 5-methyl-1,4-hexadiene, 7-methyl-1,6-octadiene, 3,7-dimethyl-1,6-octadiene, 5,7-dimethyl-1,6-octadiene, 1,7-octadiene, 3,7,11-trimethyl-1,6,10-octatriene, 6-methyl-1,5-heptadiene, 1,6-heptadiene, 1,8-nonadiene, 1,9-decadiene, or 1,10-undecanediene, etc.

In a preferred embodiment, the olefin based polymer is selected from ethylene based polymers and propylene based polymers. Ethylene based polymer is any homopolymer or copolymer containing ethylene as the monomer, such as polyethylene, ethylene/vinyl acetate copolymer (EVA), ethylene-butyl acrylate copolymer (EBA), ethylene-acrylate, ethylene-acrylic acid ionomers, cyclic olefin polymers such as ethylene-norbornene copolymers, ethylene-α-olefin copolymers (block or random), among which ethylene-α-olefin copolymers are the preferred option. Taking polyethylene (PE) as an example, examples include: high-density polyethylene, ultra-high molecular weight high-density polyethylene, low-density polyethylene, linear low-density polyethylene, and ultra-low-density polyethylene etc. Taking ethylene-α-olefin copolymer as an example, examples include: ethylene-propylene copolymer, ethylene-1-butene copolymer, ethylene-1-hexene copolymer, ethylene-1-heptene copolymer, ethylene-1-octene copolymer, ethylene-4-methyl-1-pentene copolymer, ethylene-1-nonene copolymer, ethylene-1-decene copolymer, chlorinated polyethylene propylene-butene copolymer, or their modifiers etc. The propylene based polymer is any homopolymer or copolymer containing propylene as the monomer, such as polypropylene, chlorinated polypropylene, propylene-α-olefin copolymer (block or random). Taking propylene-α-olefin copolymer as an example, examples include: propylene-ethylene copolymer, propylene-1-butene copolymer, propylene-1-hexene copolymer, propylene-1-heptene copolymer, propylene-1-octene copolymer, propylene-4-methyl-1-pentene copolymer, propylene-1-nonene copolymer, propylene-1-decene copolymer, propylene-pentene random copolymer, propylene-ethylene-pentene random copolymer, propylene-ethylene-hexene random copolymer, etc., or their modifier etc.

In a preferred embodiment, the olefin based polymer is selected from high-density polyethylene (HDPE), isotactic polypropylene (PP), ethylene-α-olefin copolymer (POE) and a combination thereof.

In a preferred embodiment, based on the total weight of the polymer composition, the content of the olefin based polymer is not greater than 20 wt % or preferably not greater than 15 wt %. The present invention also includes examples in which olefin based polymers are not added. In addition, when the content of the olefin based polymer is more than 0 wt % based on the total weight of the polymer composition, that is, when the polymer composition includes the olefin based polymer, the melt flow index (MFI) of the polymer composition is 20 g/10 min~60 g/10 min (230° C., 2.16 kg), preferably 30 g/10 min~50 g/10 min (230° C., 2.16 kg). The 50% unload stress of the polymer composition is greater than or equal to 0.49 MPa. The permanent set of the polymer composition is less than or equal to 25%.

According to some embodiments, in order to further increase applicability or enhance the physical or chemical properties, the polymer composition may further include less than 7 wt % of processing aids based on the total weight of the polymer composition. The processing aid may include a plasticizer, a melt strength enhancer, an antioxidant, an anti-sticking agent, a lubricant, a softener, a compatibilizer, an antistatic agent or a combination thereof.

Application of the Polymer Composition

The present invention provides fibers and non-woven fabrics formed by the aforementioned polymer composition, in particular elastic fibers and non-woven fabrics for hygiene materials and fabric applications. The present invention provides fibers and non-woven fabrics with superior elasticity and working flowability. The fiber of the present invention is made from the aforementioned polymer composition. The non-woven fabric of the present invention has a multilayer structure including at least one non-woven fiber layer, which is made from the aforementioned polymer composition, wherein the non-woven fiber layer is formed by spun bonding (S) or melt blowing (M). The spun bonding method extrudes and stretches the molten polymer composition to form continuous filaments. The filaments are laid into a web, which then becomes a non-woven fabric through bonding by itself, thermally bonding, chemically bonding or mechanical reinforcing. In the melt blowing method, the molten polymer composition is extruded into a high-speed hot air stream by an extruder to form superfine fibers, which is blown to the collector and accumulated to form the superfine fiber network structure.

Specifically, the polymer composition of the present invention can be compounded in a single screw or twin-screw extruder to form a mixture. This mixture can be pelletized as needed. The following is an example in which the polymer composition of the present invention is pelletized and then made into a sheet for detecting mechanical properties.

Example 1

The polymer composition of Example 1: 100 wt % of polymer B. This polymer composition was blended and pelletized at 160~220° C. in a twin-screw extruder. The pelletized product was injected to form a test piece with a thickness of 2 mm (length and width: 12 cm×12 cm) by the injection machine, and then the injected test piece was hot-pressed into thin sheets (thickness=200~300 um) using a molding machine at a processing temperature of 160° C. with preheating for three minutes, exhausting twice and actual hot pressing for four minutes. The standard test pieces (length and width: 1 inch×12 inch) were cut from the hot-pressed sheets using a film cutter, and then subject to various property tests. The results are shown in Table 2.

Comparative Example PP

The polymer composition of Comparative Example PP: 100 wt % of isotactic polypropylene (Isotactic PP: Yungsox PP-1352F, Formosa Plastics Corporation). The remaining steps are the same as in Example 1, and the results are shown in Table 2.

TABLE 2

| Polymer composition | Comp. Ex. PP | Ex. 1 |
|---|---|---|
| Isotactic PP (wt %) | 100 | |
| Polymer B (wt %) | | 100 |
| Physical properties of the polymer composition/sheet | | |
| MFI at 230° C. & 2.16 kg (g/10 min) | 33.3 | 50.4 |
| 200% peak stress (MPa) | — | 2.61 |
| 50% unload stress (MPa) | — | 1 |
| Permanent set (%) | — | 11 |

The MFI shown in the tables of the present invention can be regarded as a flowability index of the polymer composition, and the higher the MFI, the better the flowability and processability. The 50% unload stress and permanent set shown in the tables of the present invention can be regarded as the elasticity index of the sheet. The higher the 50% unload stress or the lower the permanent set, the better the elasticity. Table 2 shows that the isotactic polypropylene sheet of Comparative Example PP cannot measure the permanent set and 50% unload stress. Compared with Comparative Example PP, the sheet of polymer B of Example 1 obviously has better elasticity.

The preparation method of the sheets of Examples 2 to 8 exemplified in the present invention and Comparative Examples 1 to 9 is the same as that of Example 1, except the polymer composition.

TABLE 3

| Polymer composition | Comp. Ex. 1 | Ex. 1 | Comp. Ex. 2 | Ex. 2 | Comp. Ex. 3 | Ex. 3 | Comp. Ex. 4 | Ex. 4 |
|---|---|---|---|---|---|---|---|---|
| T-6014 (wt %) | 100% | — | 85% | — | 70% | — | 50% | — |
| Polymer B (wt %) | — | 100% | — | 85% | — | 70% | — | 50% |
| Isotactic PP (wt %) | — | — | 15% | 15% | 30% | 30% | 50% | 50% |
| Physical properties of the polymer composition/sheet | | | | | | | | |
| MFI at 230° C.& 2.16 kg(g/10 min) | 7.2 | 50.4 | 8.8 | 42.4 | 11.3 | 40.7 | 17.1 | 38.3 |
| 200% peak stress (MPa) | 2.37 | 2.61 | 4.24 | 4.98 | 6.99 | 9.48 | 13.17 | 16.3 |
| 50% unload stress (MPa) | 0.86 | 1 | 0.82 | 0.94 | 0.43 | 0.49 | 0 | 0 |
| Permanent set (%) | 11 | 11 | 15 | 14 | 27 | 25 | 80 | 78 |

From Examples 1 to 4 in Table 3, it can be seen that as isotactic polypropylene in the polymer composition increases, the elasticity of the sheet gradually deteriorates. Compared with the polymer T-6014 sheet of Comparative Example 1, the polymer B sheet of Example 1 has better elasticity under the condition of polymer composition without isotactic polypropylene. Compared to the polymer T-6014 sheet of Comparative Example 2/Comparative Example 3, the polymer B sheets of Example 2/Example 3 have better flexibility under the condition of polymer composition containing 15 wt %/30 wt % isotactic polypropylene. Under the condition of polymer composition containing 50 wt % of isotactic polypropylene, the elasticity of the polymer T-6014 sheet of Comparative Example 4 and the polymer B sheet of Example 4 are obviously not good. In addition, T-6014 has a low MFI with and without adding isotactic polypropylene, which obviously exhibits poor flowability. However, polymer B can maintain a high MFI even if isotactic polypropylene is added. It can be seen that polymer B still has the advantages of high flowability and high elasticity at the same time when an appropriate amount of isotactic polypropylene is added.

TABLE 4

| Polymer composition | Comp. Ex. 5 | Ex. 5 | Comp. Ex. 6 | Ex. 6 | Ex. 7 |
|---|---|---|---|---|---|
| Polymer A (wt %) | — | 100% | — | 70% | 70% |
| MD-1648 (wt %) | 100% | — | 70% | — | — |
| Isotactic PP (wt %) | — | — | 30% | 30% | — |
| Engage-8407(POE)** (wt %) | — | — | — | — | 30% |
| Physical properties of the polymer composition/sheet | | | | | |
| MFI at 230° C. & 2.16 kg(g/10 min) | 191 | 44.4 | 142.2 | 45.3 | 54 |
| 200% peak stress (MPa) | 2.08 | 2.94 | 9.2 | 9.54 | 3.32 |
| 50% unload stress (MPa) | 0.56 | 1.06 | 0.16 | 0.5 | 0.78 |
| Permanent set (%) | 14 | 11 | 40 | 25 | 13 |

Referring to Table 4, compared with the polymer MD-1648 sheet of Comparative Example 5, the polymer A sheet of Example 5 has better elasticity under the condition of polymer composition without isotactic polypropylene. Compared to the polymer MD-1648 sheet of Comparative Example 6, the polymer A sheet of Example 6 has better elasticity under the condition of polymer composition containing 30 wt % isotactic polypropylene. In detail, because of the high vinyl content of polymer MD-1648, after the addition of isotactic polypropylene, the elastic properties of polymer MD-1648 are seriously degraded and do not meet the application requirements; while polymer A has low vinyl content and still has better elastic performance even if isotactic polypropylene is added. It can be seen that polymer A still has the advantages of high flowability and high elasticity at the same time when an appropriate amount of isotactic polypropylene is added. As for Example 7, 30% of Engage-8407 (POE) was added to the polymer composition in place of isotactic polypropylene. The results showed that compared to Example 6 where isotactic polypropylene is added, the use of POE in Example 7 could improve the elastic properties of the sheets to obtain a lower permanent set and a higher elastic recovery force. Engage-8407 is an ethylene-α-olefin copolymer produced by Dow Inc.

TABLE 5

| Polymer composition | Ex. 5 | Ex. 1 | Ex. 8 | Comp. Ex. 7 | Comp. Ex. 8 | Comp. Ex. 9 |
|---|---|---|---|---|---|---|
| Polymer A (wt %) | 100 | | | | | |
| Polymer B (wt %) | | 100 | | | | |
| Polymer C (wt %) | | | 100 | | | |
| Polymer D (wt %) | | | | 100 | | |
| Polymer E (wt %) | | | | | 100 | |
| Polymer F (wt %) | | | | | | 100 |
| Peak molecular weight (Mp, K) | 68 | 67 | 66 | 73 | 65 | 87 |
| SM1(Mp) | 4671 | 4493 | 3806 | 5503 | 5993 | 5430 |
| MFI at 230° C. & 2.16 kg (g/10 min) | 44.4 | 50.4 | 40.4 | 10.7 | 12.5 | 6.4 |
| 200% peak stress (MPa) | 2.94 | 2.61 | 2.86 | 2.1 | 2.72 | 2.12 |
| 50% unload stress (MPa) | 1.06 | 1 | 0.58 | 0.75 | 0.68 | 0.86 |
| Permanent set (%) | 11 | 11 | 22 | 15 | 19 | 12 |

As mentioned above, compared with polymer D, polymer E, and polymer F, polymer A, polymer B, and polymer C have significantly better melt flow index (MFI). Table 5 shows that compared with the polymer composition mainly composed of polymer D, polymer E or polymer F or the sheets obtained from the above polymer compositions (Comparative Example 7, Comparative Example 8 and Comparative Example 9), the polymer composition mainly composed of polymer A, polymer B or polymer C or the sheet obtained from the above polymer compositions (Example 5, Example 1 and Example 8) has the advantages of high flowability and high elasticity at the same time. From the above experimental results, it can be seen that because the polymer composition of the present invention has the advantage of high flowability, when the polymer composition of the present invention is used for fibers or non-woven fabrics, the processability can be improved to smoothly produce fibers or non-woven fabrics. In addition, by examining the test results of the 50% unload stress and permanent set of the sheets composed of polymer composition of the present invention, it can be seen that the polymer composition of the present invention has the advantage of high elasticity. When the polymer composition of the present invention is used for fibers or non-woven fabrics, it can also improve the elasticity of fibers or non-woven fabrics to meet product performance requirements.

Although the present invention has been disclosed as above in preferred embodiments, it is not intended to limit the present invention. People having ordinary skills in the art can make changes and modifications without departing from the spirit and scope of the present invention. The scope of the present invention shall prevail as defined by the appended claims.

What is claimed is:

1. A polymer composition for fibers or non-woven fabrics, comprising:
   a vinyl aromatic based copolymer represented by a formula of A1-B-A2, wherein block A1 and block A2 represent identical or different vinyl aromatic blocks, block A1 or block A2 has a peak molecular weight of 3,800~4,800, block B represents a hydrogenated conjugated diene block, a vinyl structure content of a conjugated diene monomer content in the vinyl aromatic based copolymer is 32 wt %~50 wt %, and a melt flow index (MFI) of the vinyl aromatic based copolymer is 20 g/10 min~60 g/10 min (230° C., 2.16 kg); and an olefin based polymer of 0~30 wt % based on a total weight of the polymer composition.

2. The polymer composition of claim 1, wherein a vinyl aromatic monomer content of the vinyl aromatic based copolymer is 16 wt %~28 wt %.

3. The polymer composition of claim 1, wherein the vinyl structure content of the conjugated diene monomer content in the vinyl aromatic based copolymer is 32 wt %~45 wt %.

4. The polymer composition of claim 1, wherein the melt flow index of the vinyl aromatic based copolymer is 30 g/10 min~50 g/10 min (230° C., 2.16 kg).

5. The polymer composition of claim 1, wherein an order-disorder transition temperature (ODT) of the vinyl aromatic based copolymer is 200° C.~220° C.

6. The polymer composition of claim 1, wherein a peak molecular weight of the vinyl aromatic based copolymer is 62,000~74,000.

7. The polymer composition of claim 1, wherein the peak molecular weight of block A1 or block A2 is 4,400~4,700.

8. The polymer composition of claim 1, wherein a hydrogenation rate of block B is greater than or equal to 90%.

9. The polymer composition of claim 1, wherein a 50% unload stress of the polymer composition is greater than or equal to 0.49 MPa.

10. The polymer composition of claim 1, wherein a permanent set of the polymer composition is less than or equal to 25%.

11. The polymer composition of claim 1, wherein the vinyl aromatic based copolymer is Styrene-Ethylene-Butylene-Styrene block copolymer (SEBS), Styrene-Ethylene-Propylene-Styrene block copolymer (SEPS), Styrene-Ethylene-(Ethylene-Propylene)-Styrene block copolymer (SEEPS) or a combination thereof.

12. The polymer composition of claim 1, wherein the olefin based polymer is an olefin based homopolymer, an olefin based copolymer or a combination thereof.

13. The polymer composition of claim 1, wherein the olefin based polymer is selected from ethylene based polymers and propylene based polymers.

14. The polymer composition of claim 1, wherein the olefin based polymer is selected from a high density polyethylene (HDPE), an isotactic polypropylene (PP), an ethylene-α-olefin copolymer (POE) and a combination thereof.

15. The polymer composition of claim 1, wherein a content of the olefin based polymer is not greater than 20 wt % based on the total weight of the polymer composition.

16. The polymer composition of claim 1, wherein the polymer composition does not contain the olefin based polymer.

17. The polymer composition of claim 1, wherein a content of the olefin based polymer is more than 0 wt % based on the total weight of the polymer composition, and a melt flow index of the polymer composition is 20 g/10 min~60 g/10 min (230° C., 2.16 kg).

18. The polymer composition of claim 1, further comprising a processing aid.

19. A fiber made from the polymer composition of claim 1.

20. A non-woven fabric having a multilayer structure comprising at least one non-woven fiber layer made from the polymer composition of claim 1.

* * * * *